Nov. 21, 1950  J. B. MARIS  2,530,622
ADJUSTABLE AUTOMATIC INTERVAL TIMER
Filed Sept. 7, 1946  4 Sheets-Sheet 1
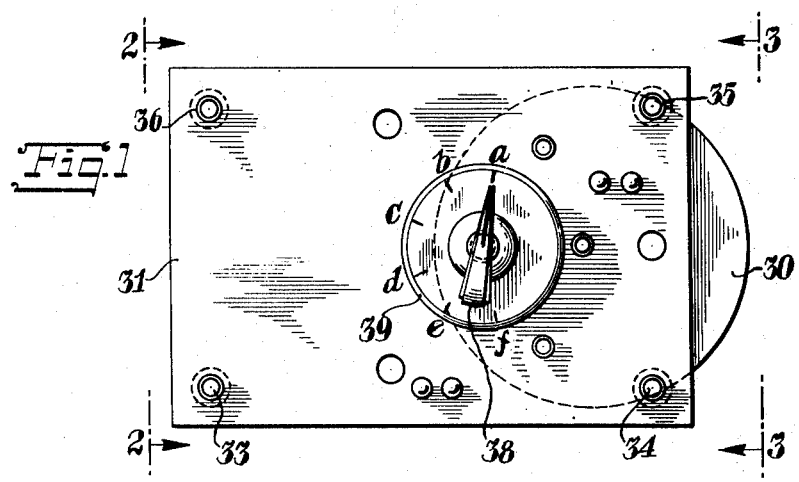
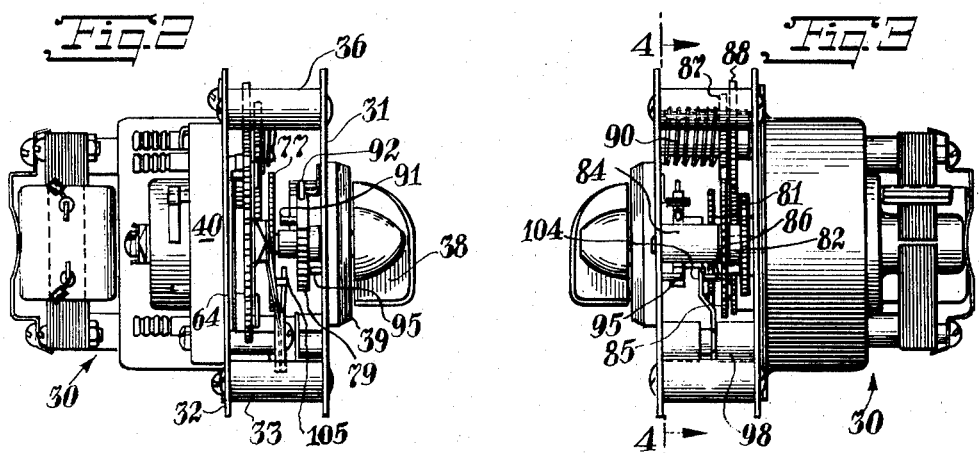
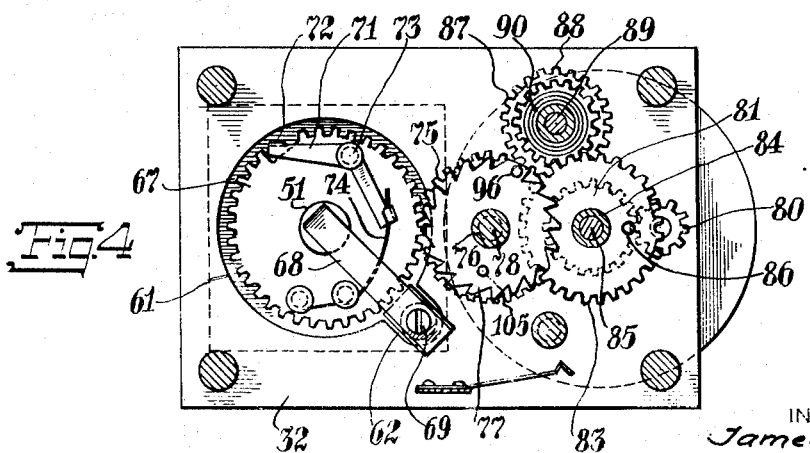
INVENTOR
James B. Maris
BY
ATTORNEY Nov. 21, 1950          J. B. MARIS          2,530,622
ADJUSTABLE AUTOMATIC INTERVAL TIMER
Filed Sept. 7, 1946          4 Sheets-Sheet 2
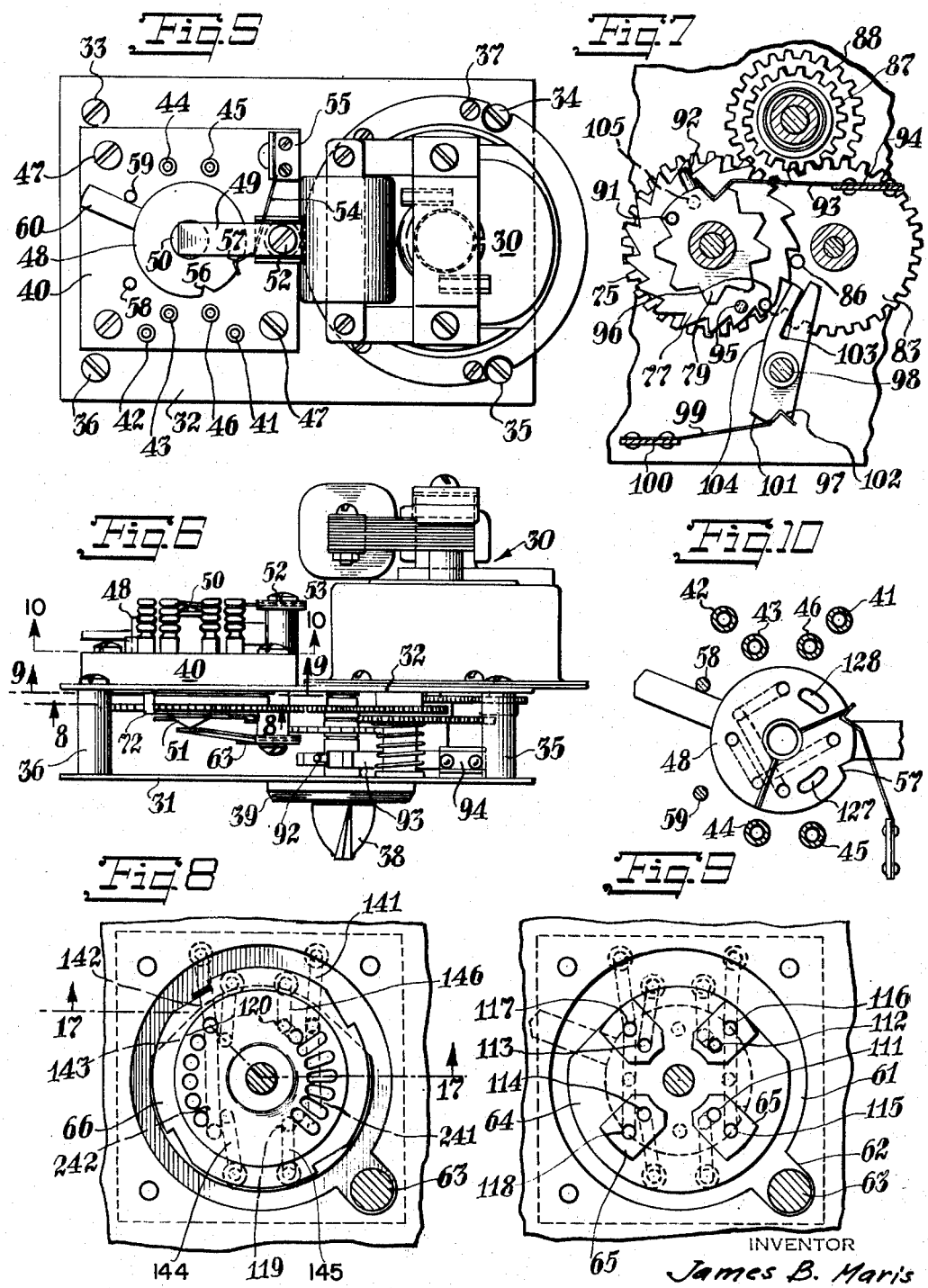
INVENTOR
James B. Maris
BY M. Bjorndal
ATTORNEY Nov. 21, 1950          J. B. MARIS          2,530,622
ADJUSTABLE AUTOMATIC INTERVAL TIMER
Filed Sept. 7, 1946          4 Sheets-Sheet 3
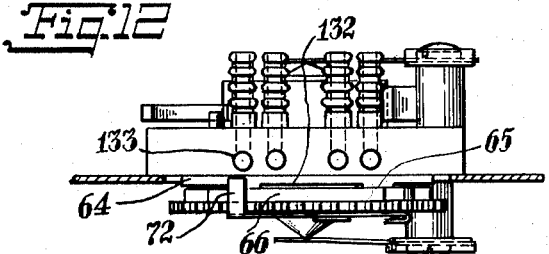
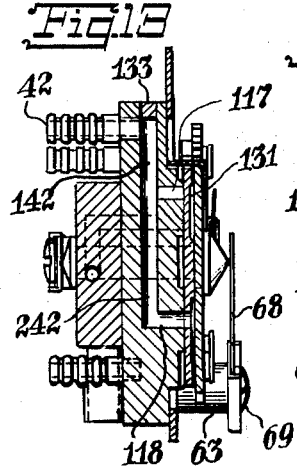
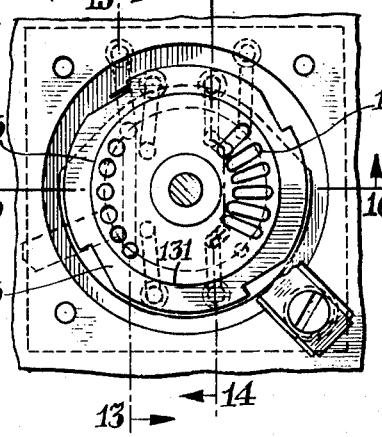
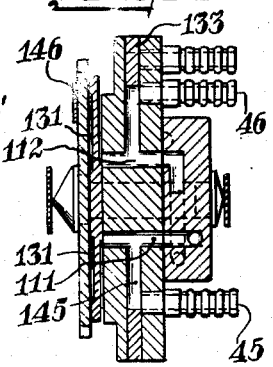
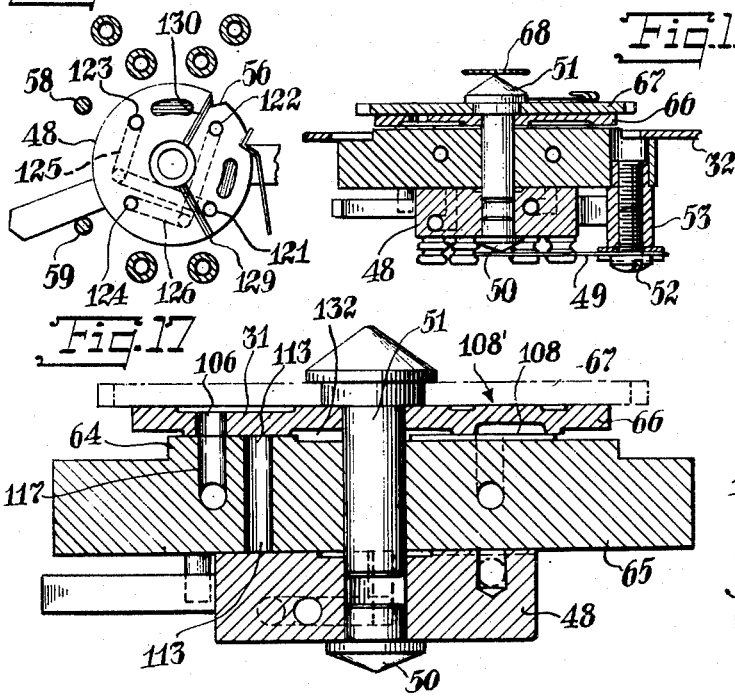
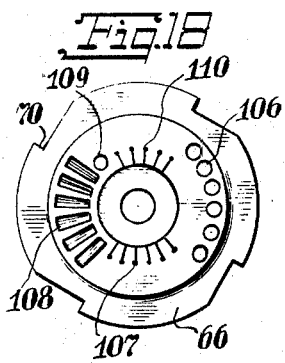
INVENTOR
James B. Maris
BY
ATTORNEY

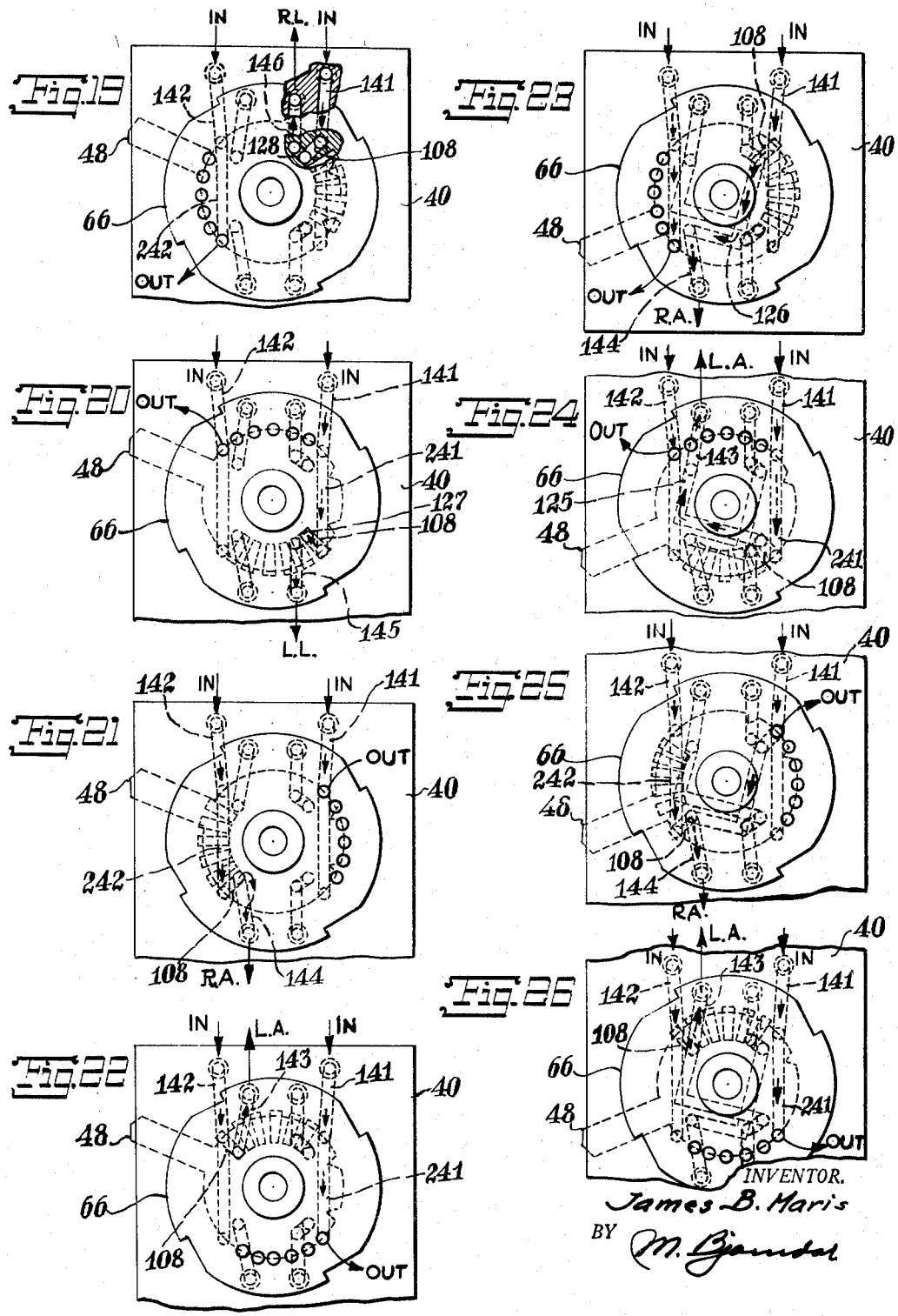

Patented Nov. 21, 1950

2,530,622

UNITED STATES PATENT OFFICE 2,530,622

ADJUSTABLE AUTOMATIC INTERVAL TIMER

James B. Maris, Glen Ridge, N. J., assignor to The Burdick Corporation, Milton, Wis., a corporation of Delaware Application September 7, 1946, Serial No. 695,537

5 Claims. (Cl. 161—7)

This invention relates to improvements in adjustable automatic interval timers of the type wherein a periodically repeated condition defines a cycle which may comprise two or more sub-cycles following each other in a predetermined order.

The sub-cycles may differ from one another in that they represent varying physical or electrical conditions in an associated mechanism, such as the "on" and "off" condition of an electrical switch. In United States Patent Specification No. 2,346,694, published April 18, 1944, I have disclosed an interval timer having two sub-cycles of independently adjustable duration. The present invention, on the other hand, is particularly concerned with an interval timer wherein the interval between any two successive operations of the timer, determining the duration of each sub-cycle, is constant for any given setting of the mechanism and wherein all the intervals of a cycle may be simultaneously adjusted over a wide range of time units. According to another aspect of the invention, means is provided for varying the number of sub-cycles constituting a full cycle, so that the apparatus may be selectively applied to control systems wherein different numbers of separate operations are required.

It is, therefore, an object of the present invention to provide a timer, of the type described, wherein the adjustment of intervals may be effected by the actuation of a simple switch.

It is another object of the invention to provide a timer wherein the number of intervals in a cycle may be varied while the apparatus is in operation.

It is a further object of the invention to provide a timer with connections for the successive establishment of a plurality of different operating conditions, and to provide means whereby some of these connections may be selectively inactivated.

Additional objects and advantages will subsequently appear.

In accordance with the invention, an interval timer may comprise a terminal block having a plurality of output connections and one or more input connections to be inserted between a load and a source of fluid pressure, electric current, or the like. Specifically, the input side of the terminal block may be connected to an air pump and the output side to pneumatic pads designed to apply pressure in cyclic rotation to selected points, e. g. the extremities of a human body. In the embodiment subsequently described by way of illustration, the several output connections are identified as "right arm" (R. A.), "left arm" (L. A.), "right leg" (R. L.) and "left leg" (L. L.) respectively, although the scope and usefulness of the present invention should not be construed as being limited to such specific application.

The terminal block may, then comprise two alternately effective intake ports and four outlet ports from which connections may be made to the arms and legs of a person in the manner aforesaid. A valve disc under the control of a pawl cyclically connects each of the outlet ports with a correlated intake port, the pawl being positive-actuated for step-by-step movement in a forward direction and friction driven for accelerated return. A rotation of the valve disc through an angle of 90 degrees defines one sub-cycle, and the duration of such rotation may be determined by varying the starting point of the pawl to which the latter is allowed to fall back upon completing its forward movement. In a particular instance, I may provide a six-position switch for this purpose whereby the operation of the timer may be adjusted for 3, 4, 5, 6, 7, and 8 minute intervals respectively. Accordingly, the duration of a full cycle may be made to vary between 12 and 32 minutes.

Provisions may further be made for such instances where it is not desirable to apply pressure to a person's arms and legs alike, as in the case of people with varicose veins where it is necessary to limit the treatment to the arms of the patient. Accordingly, the interval timer according to the invention may comprise a channel member which in a first position connects the terminals for the four-interval cycle described, whereas in a second position two of the outlet ports are permanently blocked and alternative connections are made to the other two outlet ports in the corresponding positions of the valve disc. A simple switch arm conveniently located adjacent the terminal block permits adjustment of the channel member without interference with the mechanical operation of the mechanism.

The invention will be more clearly understood from the following description, reference being had to the accompanying drawing, to which:

Fig. 1 is a front view of an interval timer according to the invention;

Figs. 2 and 3 are end views of the timer, taken respectively in the positions 2—2 and 3—3 of Fig. 1;

Fig. 4 is a section on line 4—4 of Fig. 3;

Fig. 5 is a rear view of the timer, showing the terminal block;

Fig. 6 is a top view of the timer;

Fig. 7 is a fragmentary view of the gear drive;

Figs. 8–10 are fragmentary sections taken respectively on line 8—8, 9—9, and 10—10 of Fig. 6;

Fig. 11 is a view similar to Fig. 8, showing an alternative position of the channel member;

Fig. 12 is an enlarged view of the terminal block and adjoining parts;

Figs. 13 and 14 are fractional sections taken respectively on lines 13—13 and 14—14 of Fig. 11;

Fig. 15 is a view similar to Fig. 10, showing the alternative position of the channel member;

Fig. 16 is a fragmentary section taken on line 16—16 of Fig. 11;

Fig. 17 is a fragmentary section taken on line 17—17 of Fig. 8;

Fig. 18 is a reverse view of the valve disc;

Figs. 19 through 26 are quasi-diagrammatic views of the terminal connections in eight fundamentally different positions of the mechanism.

*General construction (Figs. 1–6)*

The specific embodiment of the invention illustrated in the drawing includes a source of power, generally indicated by reference numeral 30, which may comprise a synchronous motor and a transformer of any conventional design, the precise construction of which forms no part of the present invention. The mechanism of the timer is secured to the housing plates 31, 32 which are held together by four posts 33, 34, 35 and 36. The motor assembly 30 is fastened to the rear plate 32 by means of screws 37. A switch 38 projects from the front plate 31, comprising a dial 39 on which six positions, marked *a, b, c, d, e,* and *f* are displaced from one another by an angle of 40 degrees.

The terminal block 40, comprising the two intake terminals 41, 42 and the four outlet terminals 43, 44, 45 and 46 is mounted on the rear plate 32 by means of screws 47. Projecting from the center of the block 40 is the channel member 48, rotatably held thereon by a flat spring 49 and two co-axial studs 50, 51 as will be more clearly seen from Figs. 16 and 17. The spring 49 is secured by a screw 52 to a projection 53 rising from the terminal block. A resilient tongue 54, fastened to the block 40 by a bracket 55, cooperates with two notches 56, 57 to locate the channel member 48 in either of two alternative positions determined by the stops 58, 59, a throw-over arm 60 being displaceable between these two stops.

The plate 32 is formed with a circular cutout 61 extended to 62 to receive a projection 63 rising from the terminal block 40. The cutout 61 further receives a raised shield 64 which is integral with the block 40, four radially oriented platforms 65 projecting from the shield 64 (see Fig. 9 for details). The valve disc 66, the general outline of which may be seen, for instance, in Figs. 8 and 11, is positioned adjacent the elevated portions 64, 65 by means of the stud 51 which further carries the gear 67 co-axial with disc 66. A flat spring 68 is fastened by screw 69 to projection 63 and presses upon the conical tip of the stud 51, similar to the way in which spring 49 acts upon the tip of stud 50. This arrangement maintains the parts 48, 66, 67 well centered and easily rotatable with respect to one another and to terminal block 40, at the same time permitting the removal of the channel member 48 without necessitating the disassembly of valve disc 66 and gear 67 from the terminal block.

The valve disc 66 has four ratchet teeth 70 (see, for instance, Fig. 18) spaced at an angle of 90 degrees from one another, a pawl 71 being positioned for engaging these teeth except where prevented from reaching them by the shield 64 as will be subsequently explained. The gear 67 has several teeth missing in order to accommodate the prong 72 of pawl 71, the latter being pivoted at 73 on the gear 67 and having its free end engaged by a wire spring 74 secured to the same gear. The gear 67 meshes with a gear 75, mounted on a sleeve 76 to which is also fixed the ratchet wheel 77. The sleeve 76 is carried by a shaft 78 to which the switch 38 is secured and which also supports a second, smaller ratchet wheel 79 shown, for instance, in Fig. 2 but omitted in Fig. 4 for the sake of clarity.

A pinion 80 is fixed to the drive shaft of the motor unit 30 and meshes with a gear 81 which, by means of a sleeve 82, is connected with a gear 83 spaced from the front plate 31 by a bushing 84. The sleeve 82 and the bushing 84 are carried by an arbor 85. The gear 83 is provided on its front face with a pin 86 which drives the gears 75 and 67 by engaging, once during each revolution of the gear 83, a tooth of the ratchet 77. The gear 83 further meshes with a pinion 87 and the gear 75 with a pinion 88, the latter being fixed to a shaft 89 and the pinion 87 being slidably carried on that shaft while being pressed by a coil spring 90 against the face of pinion 88. The operation of the mechanism just described will be explained in the following paragraphs.

*Interval adjusting mechanism (Fig. 7)*

The ratchet 79 is designed as a nine-tooth wheel whereof, however, only six indentations enter into operation. Accordingly, the wheel may have an undeveloped sector on which there is provided an axially directed pin 91, pointing toward the rear plate 32, and a radial pin 92. A retaining pawl 93, secured to the front plate 31 by a bracket 94, resiliently engages any of the aforesaid six indentations depending on the setting of switch 38, the position shown in Fig. 7 corresponding to position *a* of that switch. A stop pin 95, fixed to the front plate 31 (Figs. 2 and 3), prevents the rotation of the ratchet wheel 79 and switch 38 past the limiting position *f* by engaging the radial pin 92, the other limiting position *a* being determined by pin 92 abutting against the retaining pawl 93.

The ratchet 77 has a spacing of eighteen teeth of which an adjacent pair is undeveloped, the corresponding section of its periphery carrying a throw-over pin 96 pointing in the direction of plate 31. A two-pronged dog 97 is pivoted on a shaft 98, rotatable on a reduced section thereof formed by two bushings, a resilient tongue 99 being secured by a bracket 100 to plate 31 and positioned so as to cooperate alternatively with a lip 101 and a notch 102 provided on the dog 97. The right-hand prong 103, in the plane of the ratchet 77, cooperates with the teeth of this ratchet when the dog is positioned so that the tongue 99 engages lip 101, this being its normal position. In this condition the mechanism is adjusted for the step-by-step advance of ratchet 77 and gear 75 in a counter-clockwise and gear 67 in a clockwise direction, as viewed in Figs. 4 and 7, prong 72 of pawl 71 acting to displace the valve disc 66 along with gear 67. When the ratchet 77 has turned sufficiently that pin 96 may abut against the left-hand prong 104 of the dog 97, which normally overlies this wheel as seen in Fig. 3, the dog in the course of the next step of ratchet 77 is thrown into the position shown in Fig. 7, permitting the wheels 67, 75 and 77 to rotate in reverse direction under the influence of the frictional coupling between pinions 87 and 88 whereupon the pawl 71 is returned to a point from where it may subsequently engage a new ratchet tooth 70 on the valve disc 66. This reverse movement takes place during less than a full revolution of the gear 83, whereupon the pin 86 on that gear makes contact with the right-hand prong 103 and restores the dog 97 to normal, immediately thereafter beginning a new cycle of step-by-step forward rotation by engaging a tooth on the ratchet 77.

The point to which the ratchet 77, and, consequently, the pawl 71 may fall back during its reverse movement is determined by the position of pin 91 which engages another pin 105, secured to the wheel 77, whereby the pinion 88 is decoupled from pinion 87. The location of pin 91 in the switching position $a$ is such that the ratchet 77 may make almost a full revolution without being stopped by the pins. A sub-cycle of the mechanism in this position equals sixteen revolutions of the gear 83. This number is reduced by two revolutions in each consecutive position of the switch 38, so that finally in position $f$ the pawl 71 is returned after engagement of only six teeth of ratchet 77 by the dividing pin 86.

Thus, in position $f$, a sub-cycle corresponds to the engagement of only one-third of the teeth of ratchet 77 by the pin 86, that is the gear 75 rotates through an angle of 120 degrees. The tooth ratio of gears 75 and 67 is three to four so that the latter gear will at the same time rotate through an angle of 90 degrees, that is the prong 72 of pawl 71 will just be able to engage a subsequent tooth 70 on valve disc 66. In position $e$, for example, the pawl 71 still carries the disc 66 through an angle of 90 degrees, but a time interval corresponding to two revolutions of gear 83 must elapse before the prong 72 is brought up against a tooth 70 from its starting position. This interval may be multiplied two, three, four or five times by setting the switch 38 to positions $d, c, b$ and $a$ respectively.

It will be realized that the path of the pawl 71 covers an angle of 180 degrees in position $c$ and that the prong 72 would therefore engage not the tooth immediately following but the one next to it whenever the switch is set at $a, b$ or $c$. To avoid this, the prong 72 is extended so as to overhang the shield 64 (best seen in Fig. 12) which is shaped so that no more than two adjoining teeth 70 will be exposed at any one time (see Figs. 8 and 11).

The speed of the synchronous motor and the gear ratio of the mechanism may be selected so that a revolution of the gear 83 is completed in half a minute; it will then be seen that switch position $a$ corresponds to a sub-cycle of eight minutes and that a full minute will be deducted therefrom for each step the switch 38 is advanced toward position $f$. The minimum sub-cycle will therefore be equal to an interval of three minutes, and the full cycle (corresponding to a complete revolution of valve disc 66) may be varied between 12 and 32 minutes.

*The terminal connections (Figs. 8–18)*

A full revolution of the gear 83 may be termed an operational step, and we can subsequently distinguish between "effective" and "idle" steps depending on whether or not the pawl 71 engages a tooth 70 at the particular time. It has been established that a sub-cycle always includes six "effective" steps in which the valve disc 66 is successively displaced over an angle of 90 degrees, to which may be added any even number of "idle" steps up to eight (and including zero) in the course of which the prong 72 approaches a ratchet tooth. Since it is desired that a particular condition be maintained for the duration of a sub-cycle, it will be necessary to design the disc 66 so that its effect may remain the same in six consecutive positions.

The reverse side of valve disc 66 which faces the terminal block 40 is shown in Fig. 18. It may be seen that the disc is divided into four quadrants, corresponding to the four ratchet teeth 70, of which the first quadrant comprises the six discharge holes 106, the second the six bleeder slots 107, the third the six radial grooves 108, and the fourth combination of a discharge port 109 and five additional bleeder slots 110. The grooves 108 are visible as slight protuberations 108 on the other side of the disc 66 as shown in Fig. 8.

The platforms 65 are provided with pairs of radially spaced holes of which those on the inner circle, marked 111–114, pass clear through the terminal block 40 while the outer ones, 115–118, are blined holes in that they extend only about half-way into the block. Two additional blind holes 119, 120 are provided on the reverse side of the terminal block, see, for instance Fig. 14.

The terminal block 40 comprises an internal channel system which permanently connects the terminals 41–46 with associated holes 113—120, in the following manner: A channel 141 connects the intake terminal 41 with hole 116 and a channel 241 extends this connection to hole 115. Similarly, a channel 142 connects the intake terminal 42 with hole 117 and a channel 242 extends this connection to hole 118. Outlet terminals 43 and 44 are connected through channels 143, 144 with holes 113, 114 respectively, while outlet terminals 45 and 46 are similarly connected through channels 145, 146 with holes 119 and 120. No permanent connection exists between holes 111, 112, and any terminal 41–46.

The channel member 48 has four blind holes 121–124 positioned so as to register with holes 111–114, respectively, when this member occupies the position shown in Fig. 15 with the tongue 54 engaging its notch 57. An angularly disposed channel 125 interconnects the diagonally opposite holes 121, 123 while a similar channel 126 interconnects the remaining holes 122, 124. The channels 125, 126 are arranged at different levels of member 48 so as not to intersect each other.

The member 48 further comprises two shallow, elongated depressions 127 and 128. In the position shown in Fig. 10, these depressions form respective bridges between holes 111, 119 and between holes 112, 120. There are also provided two bleeder slots 129 and 130.

The grooves 108 in valve disc 66 are positioned so as to connect any of the inner holes 111–114 with its associated outer holes 115–118. The holes 106 communicate only with the outer holes 115–118, while the port 109 and bleeder slots 107, 110 register with the inner holes 111–114. The holes 106 are in constant communication with one another, due to being located in a depressed annular portion 131 of the disc 66. Some of these holes are, moveover, always connected to one of the clearances 132 provided between the platforms 65.

In practice, the channels 141–146 and 241–242 may be drilled from the sides of the block 40 and the ends subsequently closed by plugs 133, as shown in Figs. 12–14. The channels 125, 126 in member 48 may be produced in a similar manner.

*The operating cycle (Figs. 19–26)*

The various operating conditions made possible by the arrangement hereinabove described will now be analyzed. Each of the Figs. 19–26 illustrates a particular relative position of the members 40, 48 and 66 which is representative of a respective sub-cycle, the last (sixth) position of the valve disc 66 being shown in each instance. In Figs. 19–22, the channel member 48 is shown in the position corresponding to Fig. 10; in the remaining four views its position corresponds to that given in Fig. 15.

For the purpose of this illustration, reference will be had to terminals 43–46 as the right-arm, left-arm, right-leg, left-leg connections respectively, indicated in the drawing by R. A., L. A., R. L., and L. L.

In the typical positions shown on the left-hand side of the drawing, depression 127 interconnects the holes 111, 119 and depression 128 similarly interconnects the holes 112, 120. The holes 121–124 are not aligned with the bores 111–114 and have no influence on the cycle, having therefore been omitted in the first four figures under consideration. In position 1 (Fig. 19), the grooves 108 are consecutively bridged across the holes 112, 116 so that a continuous connection is established between the right-hand inlet port 41 and R. L. terminal 46, via channel 141, hole 116, groove 108, bore 112, depression 128, hole 120, channel 146. The left-hand inlet port 42 discharges freely into the atmosphere, by way of channels, 142, 242, hole 118, holes 106, clearance 132.

On the next effective step of the mechanism, disc 66 is displaced by an angle of 15 degrees whereupon the discharge port 109 (not shown in Figs. 19–26) registers with bore 112 so as to release the pressure in the associated right-leg connection by way of depressed portion 131, holes 109 and clearance 132. The grooves 108 interconnect holes 111 and 115 (Fig. 20), and the intake 41 is through-connected to the L. L. terminal 45 via channels 141, 241, hole 115, groove 108, bore 111, depression 127, hole 119, channel 145. Intake 42 discharges through channel 142, holes 106, clearance 132. After the initial release of its pressure through port 109, terminal 46 remains connected to atmosphere for the rest of the sub-cycle by means of bleeder slots 110 registering with bore 112.

In Fig. 21, inlet terminal 41 and R. A. terminal 44 are interconnected by a circuit which should now be obvious. Pressure is removed from the left-leg connection through port 109 and, subsequently, through bleeder slots 110 while the inlet terminal 42 discharges through holes 116 and 106.

In Fig. 22, finally, the intake 41 is connected to the left-arm outlet terminal 43 to complete the cycle. The input pressure at 42 is dissipated through holes 115, 106 and the removal of pressure from the right-arm connection is accomplished in the manner previously described. It will be noted that bleeder slots 107 are at this juncture in communication with the terminal 46, in order to prevent any undesired pressure from being built up in the momentarily inactive right-leg connection.

The conditions represented by Figs. 23–26 are identical with those shown in their counterparts on the left, except for the fact that the member 48 is now in the position illustrated in Fig. 15. The depressions 127, 128 are no longer in position to connect with any of the terminal block and have been omitted in these views. On the other hand, holes 121–124 register with bores 111–114, respectively, with the result that bores 111, 112 are now in permanent communication with their diagonally opposite numbers 113, 114.

The bridge between holes 112 and 120 having been removed, no pressure can be applied to the R. L. terminal 46 in position 1 (Fig. 23); instead, the circuit from intake terminal 41 is extended through channel 126 to the R. A. terminal 44, inlet from terminal 41 is applied to the left-arm terminal 43 rather than to the left-leg connection at 45. Fig. 25, which is analogous to Fig. 21, shows the circuit again established between terminals 42 and 44, and in Fig. 26 terminal 42 communicates with terminal 43 as was the case in Fig. 22. Bleeder slots 129, 130 register with holes 119, 120 respectively, permanently connecting the terminals 45 and 46 (which are inactive) with the atmosphere.

The operation of the mechanism should now be clear to anyone skilled in the art, and numerous modifications and adaptations may readily occur to those interested without constituting a departure from the spirit and scope of my invention. The nature of the invention having been ascertained in the foregoing specification, its scope will be defined in the appended claims.

I claim:

1. An interval timer comprising a drive shaft, mechanism associated with said drive shaft including a control gear, a driving member carried by said control gear, a ratchet wheel arranged to be stepped one tooth by said driving member during each revolution of said control gear, a frictional coupling between said ratchet wheel tending to rotate the latter in a sense opposite to the direction of motion to said driving member, a rotary valve member having a plurality of spaced teeth, a pawl positionable for the successive engagement of said spaced teeth, means connecting said pawl with said ratchet wheel, means for normally opposing the action of said frictional coupling, means including a stationary stop member for arresting said ratchet wheel in a predetermined angular position subsequent to the action of said frictional coupling and manually resettable means for varying the position of said stationary stop member.

2. In an interval timer, a continuously rotatable control member, a controlled member, means effective in a predetermined angular position of said control member to step said controlled member in a given direction, continuously operative means tending to displace said controlled member in an opposite direction, normally effective means for preventing the displacement of said controlled member in said opposite direction, and means effective in the interval of two consecutive operations of said stepping means for temporarily inactivating said normally effective means whereby said controlled member is returned to a starting position.

3. In an interval timer, a continuously rotatable control member, a controlled member, means effective in a predetermined angular position of said control member to step said controlled member in a given direction, continuously operative means tending to displace said controlled member in an opposite direction, normally effective means for preventing the displacement of said controlled member in said opposite direction, means effective in the interval of two consecutive operations of said stepping means for temporarily inactivating said normally effective means, and manually resettable means for limiting the displacement of said controlled member under the action of said continuously operative means.

4. In an interval timer, a continuously rotatable gear, a projection on said gear, a ratchet having its teeth positioned for engagement by said projection so as to be rotated thereby in a given direction, a first pinion positive-connected to said gear, a second pinion friction-coupled to said first pinion and positive-connected to said ratchet whereby the latter may be rotated in an opposite direction, a dog normally effective to prevent rotation of the ratchet in said opposite direction, a second projection on said ratchet for deflecting said dog in a given angular position of the ratchet, and means including said first projection for restoring the dog to normal during the next successive revolution of said gear.

5. In an interval timer, a continuously rotatable gear, a first pin carried by said gear, a ratchet having its teeth position for engagement by said pin so as to be rotated thereby in a given direction, a first pinion positive-connected to said gear, a second pinion friction-coupled to said first pinion and positive-connected to said ratchet whereby the latter may be rotated in an opposite direction, a dog normally effective to prevent rotation of the ratchet in said opposite direction, a second pin carried by said ratchet for deflecting said dog in a given angular position of the ratchet, a third pin carried by a manually resettable member co-axial with said ratchet, a fourth pin positioned on said ratchet for facultative engagement of said third pin, means including said first pin for restoring the dog to normal during the revolution of said gear immediately following deflection of the dog by said second pin, and means including said third and fourth pins for determining the angular position to which said ratchet may be displaced in the deflected condition of said dog.

JAMES B. MARIS.

REFERENCES CITED

The following references are of record in the file of this patent:

UNITED STATES PATENTS

| Number | Name | Date |
| --- | --- | --- |
| 2,346,694 | Maris | Apr. 18, 1944 |
| 2,367,319 | Wahlberg | Jan. 16, 1945 |